United States Patent
Park et al.

(10) Patent No.: US 9,264,720 B2
(45) Date of Patent: Feb. 16, 2016

(54) APPARATUS AND METHOD FOR MULTIMEDIA SERVICE

(75) Inventors: Kyung-Mo Park, Seoul (KR); Jae-Yeon Song, Seoul (KR)

(73) Assignee: Samsung Electronics Co., Ltd (KR)

( * ) Notice: Subject to any disclaimer, the term of this patent is extended or adjusted under 35 U.S.C. 154(b) by 1167 days.

(21) Appl. No.: 13/269,190

(22) Filed: Oct. 7, 2011

(65) Prior Publication Data

US 2012/0087417 A1    Apr. 12, 2012

(30) Foreign Application Priority Data

Oct. 8, 2010 (KR) .................. 10-2010-0098521

(51) Int. Cl.
*G06F 15/16* (2006.01)
*H04N 19/115* (2014.01)
*H04N 19/70* (2014.01)
*H04N 19/164* (2014.01)

(52) U.S. Cl.
CPC ........... *H04N 19/115* (2014.11); *H04N 19/164* (2014.11); *H04N 19/70* (2014.11)

(58) Field of Classification Search
USPC .................. 709/231, 236, 227, 223
See application file for complete search history.

(56) References Cited

U.S. PATENT DOCUMENTS

| | | |
|---|---|---|
| 2004/0049797 A1 | 3/2004 | Salmonsen |
| 2005/0028225 A1 | 2/2005 | Dawson et al. |
| 2006/0242551 A1 | 10/2006 | Maciesowicz et al. |
| 2009/0080864 A1 | 3/2009 | Rajakarunanayake |

*Primary Examiner* — Lan-Dai T Truong
(74) *Attorney, Agent, or Firm* — The Farrell Law Firm, P.C.

(57) ABSTRACT

An apparatus and method are provided for securing service quality in multimedia services. The method includes arranging media data samples in each data frame (moof) included a data field of a media data box (mdat), according to a specific rule, and recording control information based on the specific rule in a control information field (sidx) of the mdat. The control information defines an arrangement of the samples in each moof, and includes level information about a level assigned to each sample and index information about a location where each sample is arranged in the data field.

12 Claims, 3 Drawing Sheets

APPARATUS AND METHOD FOR MULTIMEDIA SERVICE

PRIORITY

This application claims priority under 35 U.S.C. § 119(a) to Korean Patent Application Serial No. 10-2010-0098521, which was filed in the Korean Intellectual Property Office on Oct. 8, 2010, the entire disclosure of which is hereby incorporated by reference.

BACKGROUND OF THE INVENTION

1. Field of the Invention

The present invention relates generally to an apparatus and method for multimedia services, and more particularly, to an apparatus and method for ensuring service quality for multimedia services.

2. Description of the Related Art

Many efforts are currently being made to improve service quality of multimedia services in a dynamic wireless environment.

Generally, in order to provide multimedia services with improved quality in a dynamic wireless environment, various plans to efficiently cope with changes in time/space-varying channel are required.

As an example of these plans, when a multimedia service is provided in a dynamic wireless environment, signal strength of each region is measured, and an appropriate bit rate is supported for each region based on the measured signal strength. In this case, however, changes in channel environment are not considered, which makes it difficult to guarantee a reliable service quality of the multimedia services. For example, if a channel environment less than a representation of a lowest bit rate for a multimedia service lasts for at least a specific time (e.g., min_Buffer Time, MPD[ ]), underflow may occur in a buffer of a server providing the multimedia service.

Conventionally, in a dynamic wireless environment, the following three plans are used to minimize degradation of service quality caused by underflow.

A first plan, i.e., a 'prepare to low-bit rate representation' plan, prepares for a representation requiring a low bit rate having a possibility of underflow, thereby minimizing a quality degradation caused by the underflow. However, this plan may cause overhead when preparing for and managing an additional representation.

A second plan, i.e., a 'moof skip' plan, minimizes underflow by skipping on a data frame (or movie fragment (moof) box) basis depending on control information provided from a media data box (mdat) for multimedia services without preparation for additional representation. However, this second plan may increase in play-out discontinuity due to the skip on a moof basis.

A third plan, i.e., an 'initial buffering (delay)' plan, provides initial buffering for a relatively long time, preparing for degradation of service quality due to a degradation of channel situations. However, this third plan may cause an increase of an initial delay, thereby decreasing a Quality of Experience (QoE).

Therefore, a need exists for a plan that effectively ensures adaptability of a bit rate, despite degradation of channel situations, when multimedia services are provided in a dynamic wireless environment.

SUMMARY OF THE INVENTION

Accordingly, the present invention has been made to solve the above-mentioned problems occurring in the prior art, and to provide at least the advantages described below.

An aspect of the present invention is to provide an apparatus and method for configuring mdat for multimedia services to adaptively adjust a service quality depending on a service environment.

Another aspect of the present invention is to provide an apparatus and method for decoding mdat for multimedia services by adaptively adjusting a service quality depending on a service environment.

Another aspect of the present invention is to provide a new structure of mdat for multimedia services, capable of adaptively adjusting a service quality depending on a service environment.

Another aspect of the present invention is to provide a data processing method that improves adaptability in multimedia services in a wireless channel environment, and a data processing system for the same.

Another aspect of the present invention is to provide an apparatus and method for ensuring service quality of Hypertext Transfer Protocol (HTTP)-based multimedia services.

Another aspect of the present invention is to provide an apparatus and method for providing an index of a unit sample group or a specific period within a data frame (or a moof box) based on control information determined considering a wireless channel environment, when Moving Picture Experts Group (MPEG) data is transmitted over an HTTP-based wireless network environment.

Another aspect of the present invention is to provide an mdat generation/decoding apparatus and method for recording, in a control information field (or segment index box (sidx)) in mdat, control information about samples that are arranged in each moof of a data field, considering the sample levels.

In accordance with an aspect of the present invention, a computer-readable medium is contained mdat accessible by a decoder, for an HTTP-based multimedia service. The mdat comprising a data structure containing a data field including multiple data frames (moofs), each moof including multiple samples arranged according to a specific rule, and a control information field (sidx) including control information generated based on the specific rule. The control information defines an arrangement of the samples in each moof, and includes level information about a level assigned to each sample and index information about a location where each sample is arranged in the data field.

In accordance with another aspect of the present invention, a method is provided for generating mdat for an HTTP-based multimedia service in a wireless environment. The method includes generating the media data box (mdat) by arranging samples generated in media data in each data frame included in a data field of the media data box (mdat) according to a specific rule, and recording control information generated based on the specific rule in a control information field (sidx) of the media data box (mdat). The control information is information defining an arrangement of multiple samples in a data frame (moof), and includes level information about a level assigned to each sample and index information about a location where each sample is arranged in the data field.

In accordance with another aspect of the present invention, an apparatus is provided for generating mdat for an HTTP-based multimedia service in a wireless environment. The apparatus includes a data field generator for generating a data field including multiple data frames (moof), in each of which multiple samples are arranged according to a specific rule; a control information field (sidx) generator for generating a control information field (sidx) in which control information corresponding to the data field is recorded; and a media data box (mdat) configurer for configuring a media data box (mdat) including the generated data field and the generated control information field (sidx). The control information is information defining an arrangement of multiple samples in a data frame (moof), and includes level information about a level assigned to each sample and index information about a location where each sample is arranged in the data field.

In accordance with another aspect of the present invention, a method is provided for decoding data for an HTTP-based multimedia service in a wireless environment. The method includes acquiring level information about a level assigned to a sample and index information about a location where each sample is arranged in a data field, from control information recorded in a control information field (sidx) included in a media data box (mdat); and decoding samples having a desired level in each of multiple data frames (moof), in which multiple samples are arranged according to a specific rule, based on the acquired level information and index information.

In accordance with another aspect of the present invention, an apparatus is provided for decoding data for an HTTP-based multimedia service in a wireless environment. The apparatus includes a control information acquirer for acquiring level information about a level assigned to a sample and index information about a location where each sample is arranged in a data field, from control information recorded in a control information field (sidx) included in a media data box (mdat); and a data decoder for decoding samples having a desired level in each of multiple data frames (moof), in which multiple samples are arranged according to a specific rule, based on the acquired level information and index information.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of certain embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

The term "multimedia services" as used herein may refer to services providing multimedia data such as music and video. Further, the multimedia services are not limited to methods of recording and transmitting media data in wired and wireless channel environments, but also includes recording media data in recoding media such as Compact Discs (CDs), Digital Video Discs (DVDs), Blu-ray® discs, hard disks and volatile memories.

In accordance with embodiment of the present invention, a plan is provided to selectively decode only samples satisfying a desired level in decoding mdat for multimedia services. To this end, an apparatus and method are described below for configuring mdat proposed for multimedia services, and an apparatus and method for decoding only the samples satisfying a specific level, from the configured mdat.

Figure 1:
FIG. 1 is a block diagram illustrating a data processing system for multimedia services according to an embodiment of the present invention.

FIG. 1 is a block diagram illustrating a data processing system for multimedia services according to an embodiment of the present invention.

Referring to FIG. 1, an mdat generation device 110 generates mdat for multimedia services. The mdat includes a control information field (or an sidx) and a data field.

The data field includes multiple data frames (or moof boxes). In each moof box, multiple samples are arranged according to a specific rule. To apply the specific rule, a level is assigned to each of the multiple samples. The same level may be assigned to each of the samples. The specific rule is defined as a rule of arranging samples in each moof box. For example, the specific rule may arrange samples assigned a same level to be concatenated in each moof box, arrange samples assigned a same level in a distributed manner, or arrange samples assigned different levels in an alternating manner.

Control information for decoding media data recorded in the moof boxes is recorded in the sidx. In particular, the control information includes control information for selectively decoding only samples assigned a specific level among samples arranged in each moof box, in order to make it possible to decode only samples that are assigned a high-priority level, when media (e.g., a wireless channel, etc.) carrying media data has poor characteristics.

Further, an mdat decoding device 120 decodes media data from the mdat generated by the mdat generation device 110. For example, the mdat decoding device 120 accesses the sidx in the mdat and reads the recorded control information. The mdat decoding device 120 decodes samples of a desired level from each moof box included in 10 a data field in the mdat, based on the read control information. That is, the mdat decoding device 120 decodes only samples satisfying a level corresponding to a priority for obtaining optimal decoding performance, based on a surrounding environment such as a channel condition. This decoding may efficiently adjust a bit rate despite changes in the surrounding environment.

As described above, the mdat decoding device 120 may efficiently adjust a bit rate a frame rate because information about a level of samples arranged in a data field is defined in the sidx. That is, by simply checking a sidx before checking a moof box, the mdat decoding device 120 may determine in which portion of the data field the samples of the desired level are located. For example, to support frame rate control, control information about the level may be created using a 'temporal id' field of H.264/Scalable Video Coding (SVC) Network Abstract Layer (NAL), or an NAL unit Reference Indicator (NRI) and NAL type of H.264/Advanced Video Coding (AVC).

When a frame rate control technique proposed by an embodiment of the present invention is applied, play-out discontinuity of moof-based skip may be reduced to prevent degradation of the quality of multimedia services caused by underflow in a wireless environment.

Figure 2:
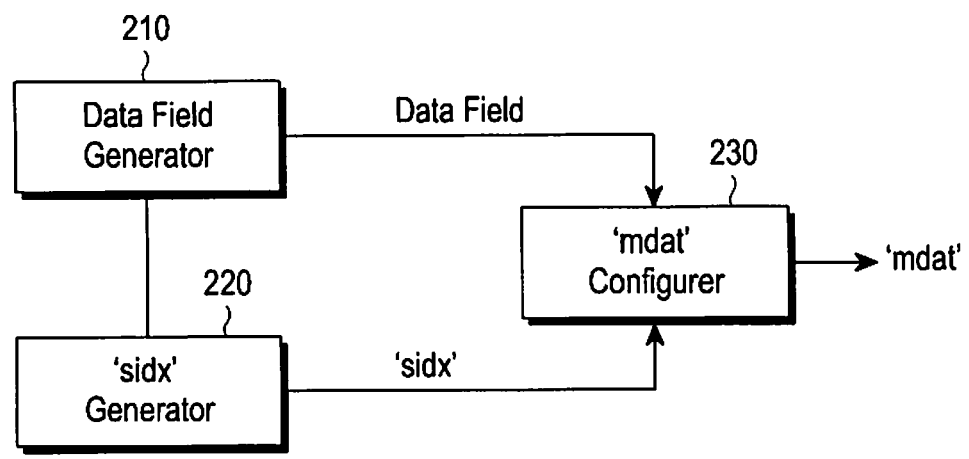
FIG. 2 is a block diagram illustrating an mdat generation device according to an embodiment of the present invention.

FIG. 2 is a block diagram illustrating an mdat generation device according to an embodiment of the present invention.

Referring to FIG. 2, the mdat generation device includes a data field generator 210, an sidx generator 220, and an mdat configurer 230. The data field generator 210 generates a data field including multiple moof boxes. In each of the moof boxes in the data field, multiple samples are arranged according to a specific rule. For example, the specific rule may arrange samples in each moof box based on a level assigned to each sample. That is, the specific rule may arrange samples of a same level to be concatenated or not. Arranging samples of a same level not to be concatenated is equivalent to arranging samples of a same level to be distributed in a moof box. Further, concatenating samples of different levels makes it possible to alternately arrange samples of a same level.

An sidx generator 220 generates an sidx in which control information is recorded, which is used to decode media data from samples arranged in each moof box in the data field. For example, the sidx generator 220 generates an sidx based on control information for decoding samples satisfying a desired level among samples that are arranged in a data field, based on the specific rule. The samples satisfying the desired level are equivalent to samples of the desired level or of a level corresponding to a priority that is higher than the priority corresponding to the desired level.

As described above, the control information recorded in the sidx and the specific rule of arranging samples in each moof box in the data field have a very close relationship. Therefore, the data field generator 210 and the sidx generator 220 should be able to share arrangement of samples in moof boxes in the data field and a level of each sample.

An mdat configurer 230 configures an mdat using the data field generated by the data field generator 210 and the sidx generated by the sidx generator 220.

Even when the data field generator 210 sequentially generates moof boxes instead of the data field, the mdat configurer 230 may configure mdat by combining the moof boxes with the sidx.

In addition, if the data field generator 210 outputs media data on a sample basis to configure a data field, the mdat configurer 230 may configure an mdat using the samples that are output by the data field generator 210 according to the specific rule. The mdat configurer 230 may know the specific rule in advance, or may receive the specific rule from the sidx generator 220 or an external medium, as occasion demands.

The control information recorded in the sidx includes level information about the level assigned to each sample for the specific rule, and index information about the location where each sample is arranged in the data field.

The mdat configured by the mdat configurer 230, as described above, may be stored in internal, external or separate recording media, or may be delivered to external media through a wired or wireless communication channel.

Although the data field generator 210, the sidx generator 220, and the mdat configurer 230 are illustrated as independent entities in FIG. 2, alternatively, the data field generator 210, the sidx generator 220, and the mdat configurer 230 may be integrated into one structure, and the same functions may be performed by the integrated structure.

Figure 3:
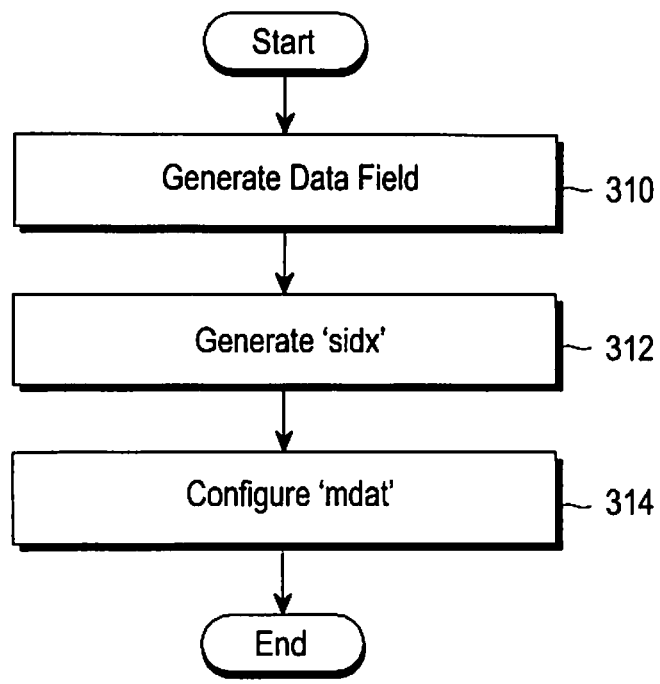
FIG. 3 is a flow diagram illustrating an mdat generation procedure according to an embodiment of the present invention.

FIG. 3 is a flow chart illustrating an mdat generation procedure according to an embodiment of the present invention.

Referring to FIG. 3, an mdat generation device generates a data field including multiple moof boxes in step 310. In each moof box, samples are arranged according to a specific rule. The specific rule is determined based on a level assigned to each sample in each moof box.

For example, the specific rule may group samples of a same level among samples arranged in one moof box, and arrange a sample group made by grouping in the moof box as one bundle. However, each sample may also be arranged in the moof boxes independently. That is, samples of different levels are arranged to be concatenated.

In step 312, the mdat generation device generates an sidx, in which control information is recorded. The control information includes control information to be used to decode media data from the samples arranged in each moof box in the data field.

For example, the mdat generation device generates control information for decoding samples satisfying a desired level among the samples that are arranged in the data field based on a specific rule. The mdat generation device generates the sidx in which the generated control information is recorded. The samples satisfying the desired level are equivalent to samples of the desired level or of a level corresponding to a priority higher than the priority corresponding to the desired level.

Alternatively, the mdat generation device does not always generate the data field and the sidx independently. That is, the generation of the data field and the generation of the sidx have a very close relationship. Namely, the control information recorded in the sidx and the rule of arranging samples in the moof box are closely related to each other. Therefore, it may be preferable that the mdat generation device considers control information in generating the data field, or considers the rule used to generate the data field in generating the sidx.

In step 314, the mdat generation device configures an mdat. That is, the mdat generation device configures the mdat using the data field generated in step 310 and the sidx generated in step 312.

Although FIG. 3 illustrates a method of generating the data field and the sidx in separate processes and then configuring the mdat using the data field and the sidx, the mdat may also be directly created using control information and media data. For example, mdat may be configured by generating samples from media data to be recorded in the data field, and arranging the generated samples in a designated location in a moof box, based on the control information.

Further, although not illustrated in FIG. 3, the mdat configured in step 314 may be stored in internal, external, or separate recording media, or may be delivered to external media through a wired or wireless communication channel.

Figure 4:
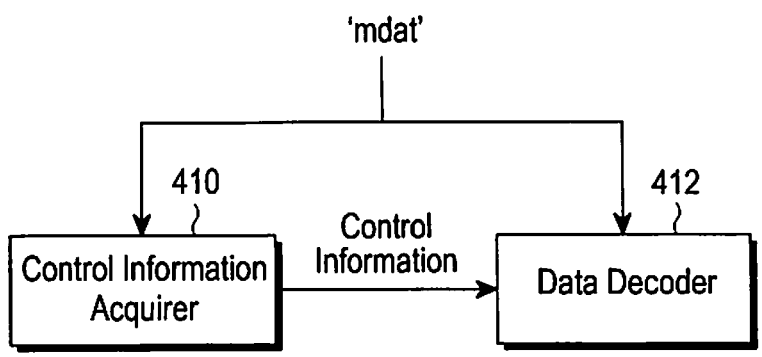
FIG. 4 is a block diagram illustrating an mdat decoding device according to an embodiment of the present invention.

FIG. 4 is a block diagram illustrating an mdat decoding device according to an embodiment of the present invention.

Referring to FIG. 4, a control information acquirer 410 receives mdat as an input, and reads control information recorded in an sidx of the mdat. The control information acquirer 410 acquires control information for sample decoding from the control information read from the sidx. The acquired control information includes control information for decoding only samples satisfying a level corresponding to a current channel environment, from a data field included in the mdat. For example, the acquired control information includes level information about the level assigned to each sample based on a specific rule, and index information about the location where each sample is arranged in a moof box included in the data field. The specific rule may be defined based on the current channel environment.

The control information acquirer 410 provides the control information acquired from the sidx to a data decoder 412.

The data decoder 412 receives, as an input, the mdat and the control information acquired by the control information acquirer 410. The data decoder 412 decodes only the samples of a desired level from each moof box included in the data field of the mdat, based on the control information. For example, it is assumed that one of first to third levels is assigned to each sample, the first level has a priority higher than that of the second level, and the second level has a priority higher than that of the third level. On this assumption, if the data decoder 412 desires to decode only the samples satisfying the second level, it determines locations of the samples assigned the first and second levels based on the control information, and then decodes the samples existing in the determined locations.

Accordingly, the data decoder 412 may decode a minimum number of samples used to obtain valid media data in the current channel condition. In addition, the data decoder 412 may determine samples of media data to be decoded by merely receiving only the sidx, without receiving all of the moof boxes included in the data field.

The specific rule, as described earlier, refers to a rule of arranging samples based on the levels assigned in each moof box.

Figure 5:
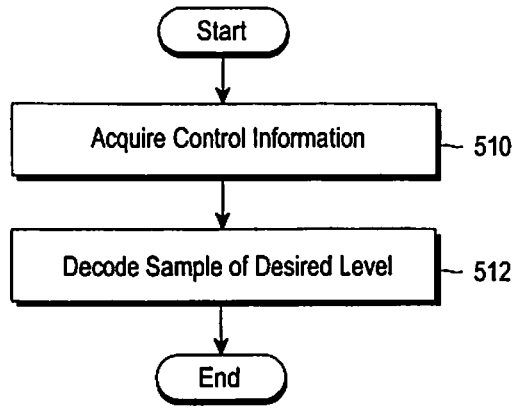
FIG. 5 is a flow diagram illustrating an mdat decoding procedure according to an embodiment of the present invention.

FIG. 5 is a flow chart illustrating an mdat decoding procedure according to an embodiment of the present invention.

Referring to FIG. 5, a mdat decoding device reads control information recorded in an sidx included in the mdat in step 510. For example, the mdat decoding device acquires control information for sample decoding from the control information recorded in the sidx. The acquired control information corresponds is provided for decoding only samples satisfying a level corresponding to a current channel environment from a data field included in the mdat. For example, the acquired control information includes level information about a level assigned to each sample based on a specific rule, and index information about a location where each sample is arranged in a moof box included in the data field. The specific rule may be defined based on the current channel environment.

In step 512, the mdat decoding device 120 decodes only the samples of a desired level from each moof box included in the data field in the mdat, based on the acquired control information.

For example, it is assumed that types of levels to be assigned to each sample to be arranged in each moof box are first to third levels, ranging from high to low priority in an order of the first level, the second level, and third level. If the mdat decoding device has decided to decode samples satisfying the second level, based on a current channel environment, the mdat decoding device decodes only samples assigned the first and second levels from each moof box included in the data field in the mdat. That is, the mdat decoding device determines locations of samples assigned the first and second levels and a size of each sample based on the control information. Thereafter, the mdat decoding device decodes the samples having the determined locations and the determined size.

Accordingly, the mdat decoding device may decode a minimum number of samples used to obtain valid media data, based on the current channel condition. In addition, the mdat decoding device may determine samples of media data to be decoded by merely receiving only the sidx, without having to receive all of the moof boxes included in the data field.

Figure 6:
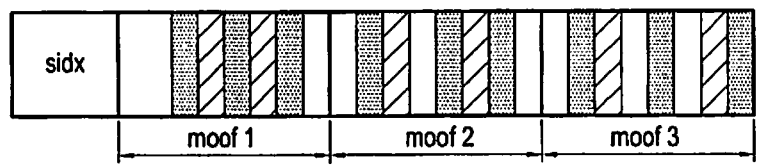
FIG. 6 illustrates an mdat configuration according to an embodiment of the present invention.
Figure 6:
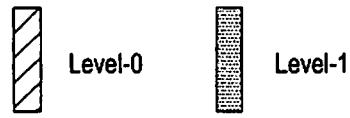

FIG. 6 illustrates an mdat configuration according to an embodiment of the present invention.

Referring to FIG. 6, an mdat includes an sidx and a data field. The data field includes three moof boxes, i.e., moof_1, moof_2, and moof_3. However, it will be apparent to those of ordinary skill in the art that the number of moof boxes included in the data field is subject to change as needed.

Each of the moof boxes moof_1, moof_2, and moof_3 includes multiple samples, which are generated from media data. The multiple samples are arranged in each of the moof boxes moof_1, moof_2, and moof_3 based on a specific rule. The specific rule defines a level assigned to each of the multiple samples arranged in the moof boxes, and the arrangement of samples in the moof boxes.

In FIG. 6, samples assigned a same level are arranged in the moof boxes in a distributed manner. For example, samples assigned different levels are arranged to be concatenated. Specifically, a sample of Level 0 is arranged after a sample of Level 1, and a sample of Level 1 is arranged after a sample of Level 0. The samples may be arranged to be either concatenated or spaced apart.

Control information is recorded in the sidx. The control information includes level information about the level assigned to each sample, and index information about the location where each sample is arranged. Therefore, samples corresponding to media data will be recorded in the data field in the mdat based on the control information. That is, a specific rule of defining arrangement of samples in a moof box may be defined as control information recorded in the sidx.

Figure 7:
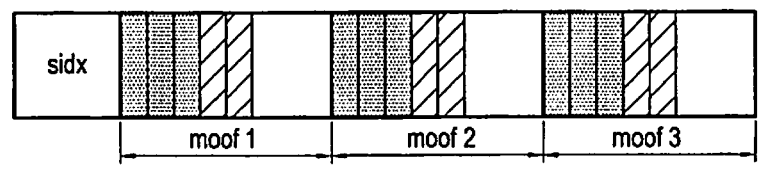
FIG. 7 illustrates an mdat configuration according to an embodiment of the present invention.
Figure 7:

FIG. 7 illustrates an mdat configuration according to another embodiment of the present invention.

Referring to FIG. 7, like the configuration illustrated in FIG. 6, the mdat includes an sidx and a data field. The data field includes three moof boxes, i.e., moof_1, moof_2, and moof_3. However, it will be apparent to those of ordinary skill in the art that the number of moof boxes included in the data field is subject to change as needed.

Each of the moof boxes moof_1, moof_2, and moof_3 includes multiple samples, which are generated from media data. The multiple samples are arranged in each of the moof boxes moof_1, moof_2, and moof_3 based on a specific rule. The specific rule defines the level assigned to each of the multiple samples arranged in moof, and the arrangement of samples in moof.

In FIG. 7, samples assigned a same level are arranged to be concatenated in a moof box. For example, in each moof box, samples assigned a same level are consecutively arranged, and thereafter, samples assigned another same level are consecutively arranged. That is, in each moof box, all of the samples of Level 0 are arranged after all of the samples of Level 1.

Control information is recorded in the sidx. The control information includes level information about the level assigned to each sample, and index information about the location where each sample is arranged. Therefore, samples corresponding to media data will be recorded in the data field in the mdat based on the control information. That is, a specific rule of defining arrangement of samples in a moof box may be defined as control information recorded in the sidx.

In the data field of the mdats illustrated in FIGS. 6 and 7, two different types (Level 0 and Level 1) of levels are used. The level has a meaning of priority in media data. The priority indicates importance corresponding to usability of decoding media data from mdat. For example, assuming that Level 0 is higher in priority than Level 1, media data may be acquired by merely decoding samples assigned Level 0 according to a channel environment.

In order to determine a decoding level according to the channel environment, associated decoding control information is used. Therefore, decoding control information is recorded in the sidx of mdat.

Table 1 below shows an example of generating the sidx.

TABLE 1

Syntax

```
aligned(8) class SegmentIndexBox extends FullBox('sidx', version, 0) {
    unsigned int(32) reference_track_ID;
    unsigned int(16) track_count;
    unsigned int(16) reference_count;
    for (i=1; i<= track_count; i++)
    {
        unsigned int(32) track_ID;
        if (version==0)
        {
            unsigned int(32) decoding_time;
        } else
        {
            unsigned int(64) decoding_time;
        }
    }
    for(i=1; i <= reference_count; i++)
    {
        bit (1)              reference_type;
        unsigned int(31)     reference_offset;
        unsigned int(31)     subsegment_duration;   //reduce size for Byte-ordering
        bit(1)               contains_RAP;
        unsigned int(31)     RAP_delta_time;
        bit(1)               contains_Level;
        if (contains_Level) //added
        {
            unsigned int(16) level_count; //number of level(e.g. temporal id), added
            for(i=1; i <= level_count; i++) //for each level, added
            {
                unsigned int(8)      level(type);     //level(e.g. temporal level) define, added
                unsigned int(16) sample_count;        //number of samples in level, added
                for(i=1; i <= sample_count; i++)      //for each samples, added
                {
                    unsigned int(32)   sample_offset;   //offest, added
                    unsigend int(32)   sample_size;     //size, added
                }
            }
        }
    }
}
```

In accordance with an embodiment of the present invention, decoding control information includes level information about the level assigned to samples in a moof box, and index information about the location where samples are arranged in a data field or in a specific moof box. Preferably, the level information is defined for each level, and the index information is defined for each sample. However, the level information may be defined for the data field, and the index information may be defined for each moof box in the data field.

The level information is used as information for determining whether a level corresponding to the priority was used in a moof box, in decoding media data, and for determining which level was used, if a level was used. For example, the level information includes identification information 'contains_Level', the number 'level_count' of level types, the number 'sample_count' of samples for each level, etc. In addition, the level information may include information ('level' or 'type') about a definition of levels.

The identification information 'contains_Level' defines an identifier indicating whether a moof box includes level information 'subsegment_Level' associated with the priority. The number 'level_count' of level types defines the number of types of levels to be assigned to samples in a moof box or the data field. The number 'sample_count' of samples for each level defines the number of samples assigned each level in each moof box or the data field.

The index information is used as information for identifying samples assigned a decoding level in the data field. For example, the index information includes location information 'sample_offset' of each sample in the data field, size information 'sample_size' of each sample, etc.

The location information 'sample_offset' of each sample is information defining a start point of a sample arranged in the data field. For example, the location information 'sample_offset' of each sample defines an offset from a specific reference point to a point where the sample starts. The specific reference point may be a start point of the data field. For example, the offset may be a byte offset from the start point of the data field to the point where the sample is arranged.

The size information 'sample_size' of each sample defines a size of each sample arranged in the moof box or the data field. If samples of the same level are arranged to be concatenated in a moof box as illustrated in FIG. 7, the total size of a sample group may be defined. Therefore, the embodiment illustrated in FIG. 7 may have less control information recorded in the sidx than the embodiment illustrated in FIG. 6.

As is apparent from the foregoing description, the structure of an mdat in accordance with the above-described embodiments of the present invention and the plan to generate and decode the mdat may minimize the degradation of the service quality that occurs due to underflow in a wireless channel environment. In addition, it is possible to improve adaptability by adaptively decoding media data according to changes in a channel condition.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A non-transitory computer-readable medium including a media data box (mdat) accessible by a decoder, for a Hypertext Transfer Protocol (HTTP)-based multimedia service, the media data box (mdat) comprising a data structure including a data field including multiple data frames (moofs), each moof including multiple samples arranged according to a specific rule, and a control information field (sidx) including control information generated based on the specific rule,
wherein the control information defines an arrangement of the samples in each moof, and includes level information about a level assigned to each sample and index information about a location where each sample is arranged in the data field.

2. The medium of claim 1, wherein the level information comprises:
an identifier indicating whether the data field includes level information associated with a priority; a number of types of levels assigned to the samples; a number of samples assigned to each level, and
wherein the index information comprises:
a location information of each sample; and a size information of each sample in the data field.

3. The medium of claim 2, wherein the location information of each sample includes a byte offset of each sample.

4. The medium of claim 1, wherein the specific rule arranges samples assigned a same level to be concatenated in a moof, arranges the samples assigned the same level in a distributed manner, or arrange samples assigned different levels in an alternating manner.

5. A method for generating a media data box (mdat) for a Hypertext Transfer Protocol (HTTP)-based multimedia service by an mdat generation apparatus in a wireless environment, the method comprising:
arranging media data samples in each data frame (moof) included a data field of the mdat, according to a specific rule; and
recording control information based on the specific rule in a control information field (sidx) of the mdat,
wherein the control information defines an arrangement of the samples in each moof, and includes level information about a level assigned to each sample and index information about a location where each sample is arranged in the data field.

6. The method of claim 5, wherein the level information includes an identifier indicating whether the data field includes level information associated with a priority, a number of types of levels assigned to the samples, and a number of samples assigned to each level, and wherein the index information includes location information of each sample and size information of each sample in the data field.

7. The method of claim 6, wherein the location information of each sample includes a byte offset of each sample.

8. The method of claim 5, wherein the specific rule arranges samples assigned a same level to be concatenated in a moof, arranges the samples assigned the same level in a distributed manner, or arranges samples assigned different levels in an alternating manner.

9. An apparatus in a wireless environment, the apparatus comprising:
a non-transitory computer-readable medium; and
a processor that, when executing instructions stored in the non-transitory computer-readable medium, generates a media data box (mdat) for a Hypertext Transfer Protocol (HTTP)-based multimedia service by:
a data field including multiple data frames (moofs), wherein each moof includes multiple samples arranged according to a specific rule;
generating a control information field (sidx) in which control information corresponding to the data field is recorded; and
configuring the mdat including the data field and the sidx,
wherein the control information defines an arrangement of multiple samples in a moof, and includes level information about a level assigned to each sample and index information about a location where each sample is arranged in the data field.

10. The apparatus of claim 9, wherein the level information comprises:
an identifier indicating whether the data field includes level information associated with a priority;
a number of types of levels assigned to the samples; and
a number of samples assigned to each level, and
wherein the index information comprises:
location information of each sample in the data field; and
size information of each sample in the data field.

11. The apparatus of claim 10, wherein the location information of each sample comprises a byte offset of each sample.

12. The apparatus of claim 9, wherein the specific rule arranges samples assigned a same level to be concatenated in a moof, arranges the samples assigned the same level in a distributed manner, or arranges samples assigned different levels in an alternating manner.

* * * * *